United States Patent [19]

Sodekoda et al.

[11] 4,008,422
[45] Feb. 15, 1977

[54] FRACTIONAL HORSEPOWER BRUSHLESS DIRECT CURRENT MOTOR

[75] Inventors: Kinzo Sodekoda, Omiya; Norikazu Taguchi, Shobumachi, both of Japan

[73] Assignee: Tanaka Instrument Co., Ltd., Yono, Japan

[22] Filed: Oct. 18, 1974

[21] Appl. No.: 516,197

[30] Foreign Application Priority Data

Mar. 18, 1974 Japan ............................ 49-18500
Feb. 18, 1974 Japan ............................ 49-18501
Feb. 18, 1974 Japan ...................... 49-18551[U]

[52] U.S. Cl. .............................. 318/138; 318/254
[51] Int. Cl.² ..................................... H02K 29/00
[58] Field of Search ......................... 318/138, 254

[56] References Cited

UNITED STATES PATENTS

| | | |
|---|---|---|
| 3,585,474 | 6/1971 | Kobayashi et al. ............... 318/254 |
| 3,662,238 | 5/1972 | Kobayashi et al. ............... 318/254 |
| 3,806,783 | 4/1974 | Lodochnikov et al. ....... 318/254 X |
| 3,903,463 | 9/1975 | Kanamori ..................... 318/254 X |

*Primary Examiner*—Gene Z. Rubinson
*Attorney, Agent, or Firm*—Wenderoth, Lind & Ponack

[57] ABSTRACT

An improved maintenance free fractional horsepower brushless direct current motor of the solid state switching circuit type wherein a rotational transducer secured to the motor shaft cooperates with each of the three detecting coils provided within a stator of the motor to excite each of the three stationary windings in order to revolve the motor into a predetermined direction.

10 Claims, 13 Drawing Figures

$i_4 = i_1 + i_3$
$i_5 = i_2 - i_3$

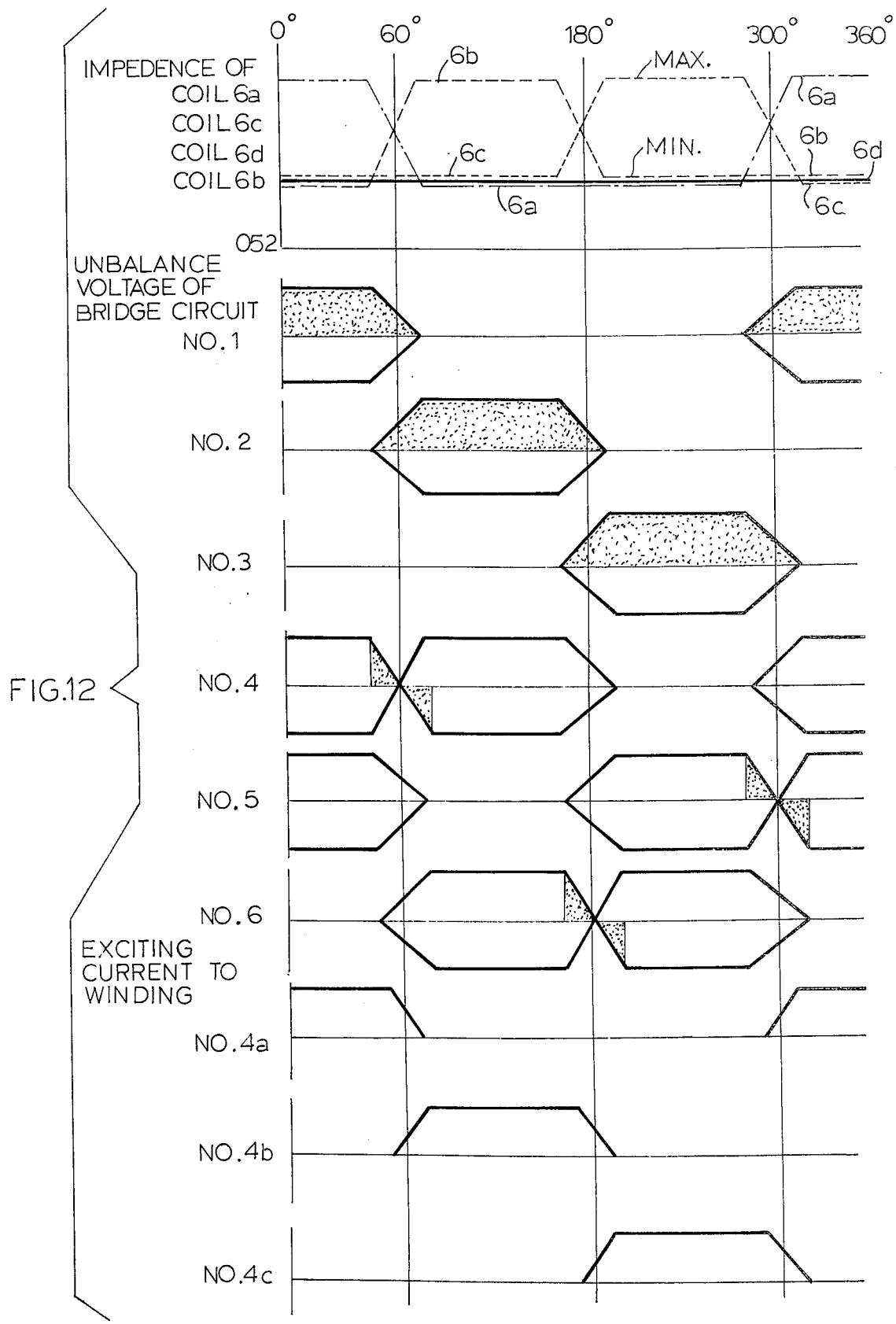

FRACTIONAL HORSEPOWER BRUSHLESS DIRECT CURRENT MOTOR

BACKGROUND OF THE INVENTION

This invention relates to fractional horsepower brushless direct current motors, and more particularly, to a brushless direct current motor having neither brushes nor commutators, but controlled by a solid state switching circuit.

It is known that the discovery of the transistor has resulted in the development of brushless direct current motors which make use of solid state switching circuits. The chief problem with brush type motors is the low reliability of the commutator and brush assembly. The brushes have a limited life and cause the commutator to wear. This wear produces brush dust which can foul the bearing and create a voltage leakage path.

Various systems have hertofore been proposed to commutate the motor current, but the transistor-switched motor is the most common.

In a brushless d.c. motor comprising a permanent magnet as a rotor and three stationary windings of the three phase Y-connection as a stator with which the present invention is concerned, it is required that the three stationary windings and the permanent magnet be excited each other in their relative position in order to give the strongest torque to the rotor to operate the motor continuously at all times into a predetermined, say, clockwise direction.

On the other hand, however, if the simultaneous excitation of the two windings should happen, a normal operation of the motor cannot be attained owing to a swinging and braking effect by the different direction electromotive forces resulting therefrom, which would be a loss. Further, if there is a position where none of the windings is excited, there arises a dead point where no force is produced. Therefore it follows that at least three stationary windings are required to operate the d.c. motor effectively.

Accordingly, in the above d.c. motor, the detection of the most appropriate position where one of the windings and the magnet are excited to produce the strongest torque is the most necessary requirement.

To attain this end, solid state switching circuitry has heretofore been proposed for switching the exciting current for the three phase stationary windings by a signal output derived from a position sensor for detecting the relative position between the permanent magnet, i.e. the rotor, and the stationary windings, i.e. the stator, of the d.c. motor.

The problem of mounting all the necessary components of the solid state switching circuit with the position sensor and the miniature d.c. motor itself on a compact single housing has been an extremely difficult one. As pointed out above, the components must also be adequately supported against the rotational forces which occur in service and must be mounted as compactly as possible because of the limited space available. These requirements have been met by a novel arrangement of the brushless fractional horsepower d.c. motor in accordance with a preferred embodiment of the invention.

SUMMARY OF THE INVENTION

In accordance with the present invention, the solid state switching circuit together with the other necessary circuit components are assembled in one unit case which can be handled as a unitary device and which is provided with several electrical wire connections for easily connecting them in place on the d.c. motor.

Furthermore, in this invention, a rotational sector-shaped transducer which cooperates with one of the detecting coils is used as a position sensor for sensing a rotor position relative to a stator winding. The transducer is secured to the rotor shaft so that it revolves together with the latter. The detecting coils, however, are secured to the stator so that they never move.

On the other hand, the solid state switching and amplifying circuitry contains several bridge circuits consisting of two coils and two resistors. One of the coils is called a "dummy coil," one of the features of this invention, which will be described hereinafter.

A balance or unbalance current is produced by the bridge circuit, and this current is switched and amplified by the differential amplifying circuit consisting of one transistor and other necessary components. The current thus amplified is applied for exciting the stationary winding of the stator.

BRIEF DESCRIPTION OF THE DRAWINGS

The invention will be more fully understood from the following description of a preferred embodiment taken in connection with the accompanying drawings, in which:

FIG. 12 is a schematic diagram showing the excitation system of this invention.

In FIG. 1 the uppermost member is housing $1a$ to which rotor shaft $3a$ is rotatably attached. Immediately below the housing $1a$ is rotor 3 to which the rotor shaft $3a$ is secured. The rotor 3 is a molded cylindrical permanent magnet made from ferrite powder pressure molded and sintered by a known method. Rotor case $3b$ shown in FIG. 2 is secured around the rotor 3, but it is not clearly illustrated in FIG. 1. Inside the rotor 3 is transducer 5 which is described in detail hereinafter. Immediately below the rotor 3 is holder 6e for holding three detecting coils 6a, 6b and 6c which cooperate with the transducer 5 inside the rotor 3. The holder 6e is a circular disk secured to stator 2 shown immediately below.

Figure 1:
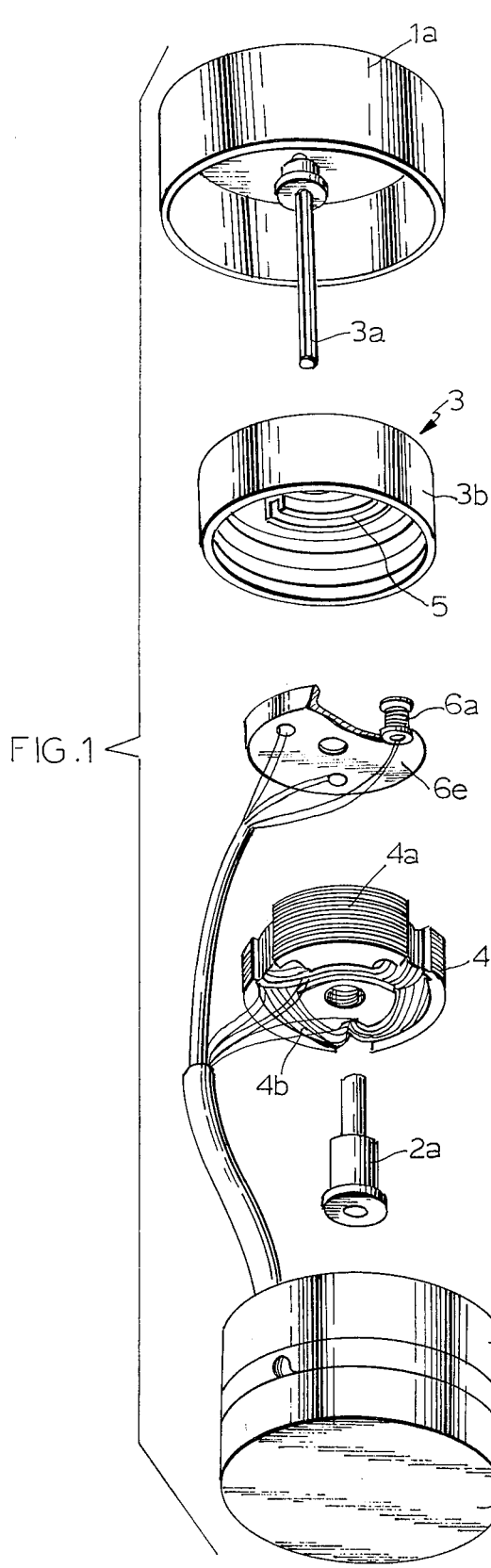
FIG. 1 is an exploded perspective view showing the essential components of a brushless d.c. motor of this invention and illustrating the relative portions of the components.

It is understood that the holder 6e is immovable while the transducer 5 is rotatable because the holder 6e is secured to the stator 2 and the transducer 5 is attached to the rotor 3. As clearly shown in FIGS. 1 – 2, the holder 6e with three detecting coils (only one coil is illustrated) is smaller in size than the inside diameter of the rotor case 3b so that it is entirely housed therein.

Immediately below the holder 6e is the stator 2 provided with three stationary windings 4a, 4b and 4c. This annular winding comprises about 150 – 200 turns of insulated copper wire 0.2 mm in diameter around each of the three salient-like cores stamped out from the laminated silicon steel stock and secured to the inside of the stator 2.

Immediately below the stator 2 is support shaft 2a which supports the holder 6e, stator 2, and cover 1b, which is immediately below the support shaft 2a. Immediately below the cover 1b is control unit 11 containing a novel solid state circuitry used for the brushless excitation system. Some of the fastening means for fastening the above components together are shown, but the remainder are omitted for brevity.

The above-mentioned components are assembled to make a preferred embodiment, brushless d.c. motor of this invention, the size of which is about 40 mm in diameter and 60 mm in length, and which has a compact cylindrical shape. The horsepower of this motor is about one-tenth hp., the supply voltage about 13 volts, the direct current 200 milliampere, and a capacity of about 2,000 – 15,000 r.p.m.

It is understood that the above limitations in connection with the preferred embodiment are not necessarily limitations on the invention, but only illustrative.

Figure 2:
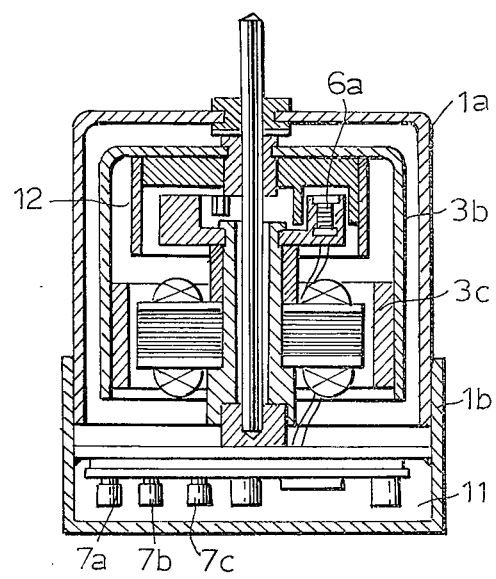
FIG. 2 is a side longitudinal sectional view of the motor of FIG. 1 after assembly.
Figure 10:
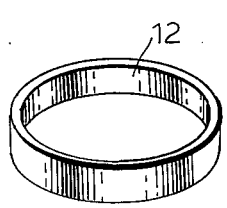
FIG. 10 is a perspective view of a shield case made of a high permeability metal for protecting the three detecting coils.

FIG. 2 is a longitudinal sectional view of the assembled motor of FIG. 1 with minor components, such as bearings, and fasteners, which need no explanation. In FIG. 2, however, an important component, shield ring 12 is shown. The shield ring 12 is not shown in FIG. 1 wherein it is rather difficult to show, because it is concealed within the rotor case 3b. The shield ring 12 is also shown in FIG. 10 which will be described in detail hereinafter.

Figure 3:
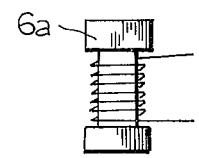
FIG. 3 is a side elevation of a detecting coil.
Figure 4:
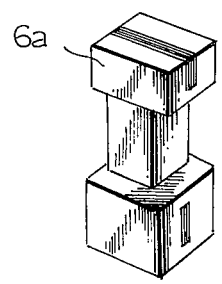
FIG. 4 is a perspective view of the detecting coil of FIG. 3 without its annular winding.
Figure 5:
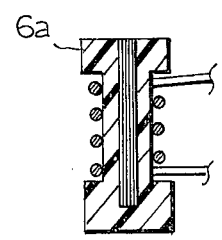
FIG. 5 is a sectional view showing how the detecting coil is assembled.

FIGS. 3 – 5 show a detecting coil 6a. FIG. 3 is a side view, FIG. 4 a perspective view, and FIG. 5 how it is manufactured. Referring to FIG. 5, a silicon steel sheet core 6g is inserted into an aperture of a rail-like bobbin case made of synthetic resin, say, ABS resin, and an annular winding comprising about 150 – 200 turns of insulated copper wire 0.06 mm in diameter is positioned around the constricted portion of the rail-like bobbin.

In FIG. 1 an holder 6e provided with an only one detecting coil 6a is shown, but the holder 6e is provided with three detecting coils. The detecting coils cooperate with the transducer 5, the details of which will be described hereinafter.

Figure 6:
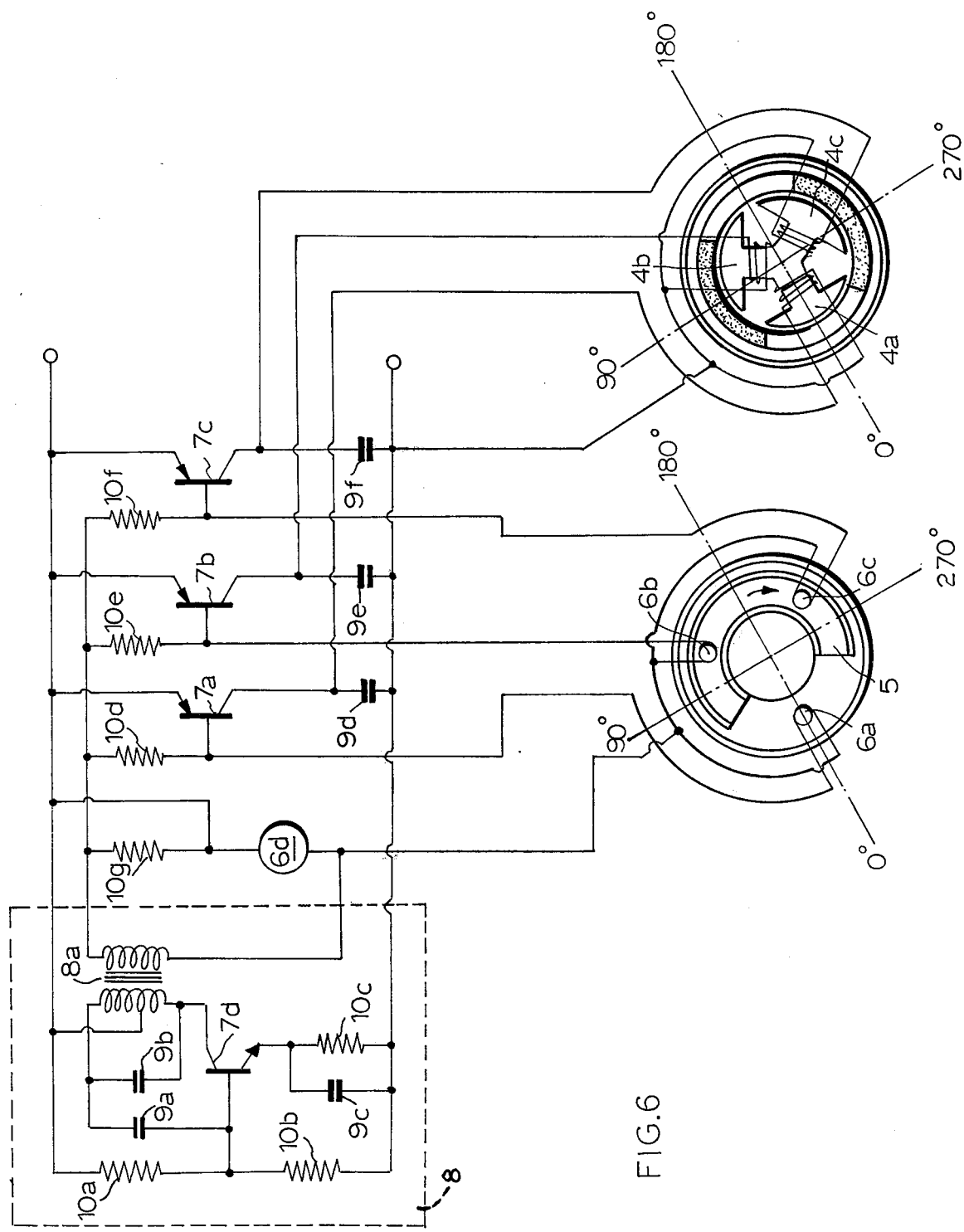
FIG. 6 is a solid state switching and amplifying circuit diagram in connection with the operation of the d.c. motor of this invention.
Figure 7:
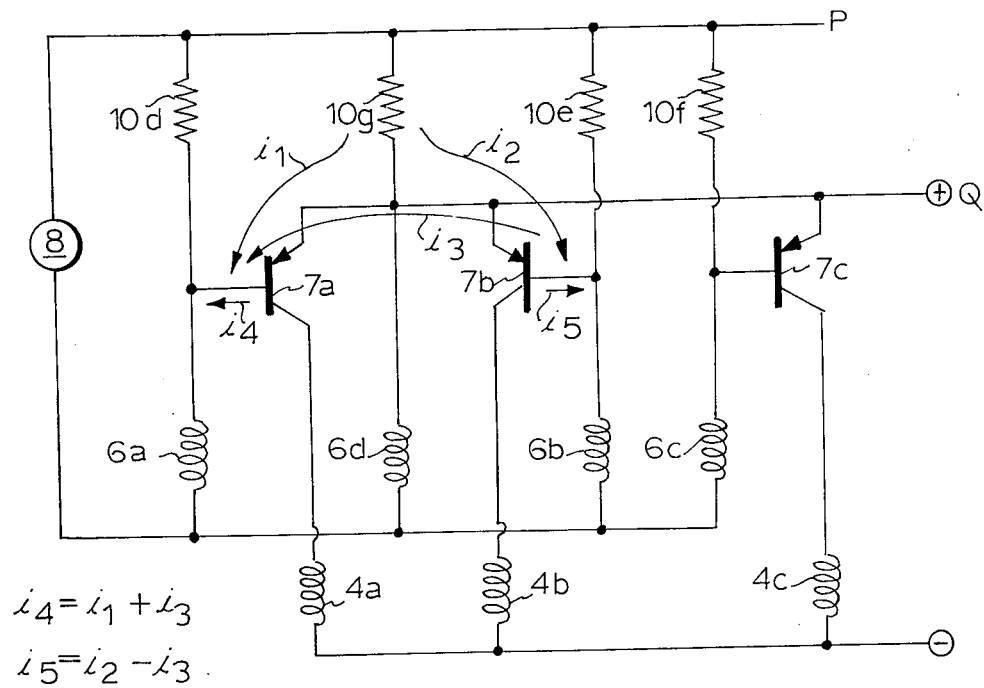
FIG. 7 is a schematic diagram showing the flow of an unbalance current in accordance with the change of impedance of the detecting coil.

FIGS. 6 – 7, and 12 will be described in detail hereinafter.

Figure 8:
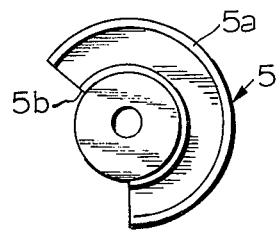
FIG. 8 is a plan view showing a sector-shaped transducer made of a non-ferrous metal, say, aluminum wherein the angle at the center thereof is 240°.
Figure 9:
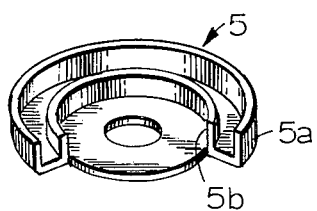
FIG. 9 is a perspective view of the transducer of FIG. 8 having two parallel walls.
Figure 13:
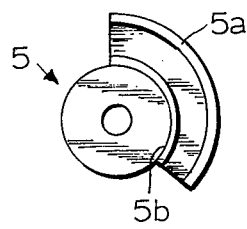
FIG. 13 is a similar view to FIG. 8 showing another sector-shaped transducer wherein the angle at the center thereof is 120°.
Figure 11:
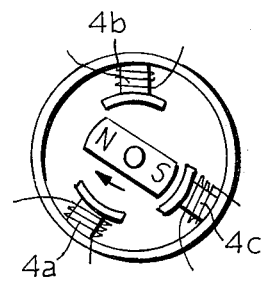
FIG. 11 is a side view showing a rotor in the form of a permanent magnet solid bar provided within the stator.

The transducer 5 shown in FIG. 8 and FIG. 13 has two parallel walls 5a and 5b, respectively, which are provided to prevent the magnetic flux issuing from the detecting coil from leaking in operation so as to concentrate it to the transducer. The transducer is 24 mm in diameter 1 mm in thickness, and its parallel walls are 5 mm in height, and the width between two walls is 4 mm. The size of the transducer is not limited, but illustrative only.

The transducer 5 in FIG. 8 covers two detecting coils while the one in FIG. 13 covers only one detecting coil. Both transducers of different sectors can be used in this invention, which will be described hereinafter.

FIG. 6 shows a schematic diagram including a solid state circuitry for the brushless excitation system in accordance with a preferred embodiment of the invention. In FIG. 6 a high frequency oscillator 8 within the dotted lines includes transistor 7d, tuned capacitor 9a, coupling capacitor 9b, bypass capacitor 9c, oscillator coil 8a, and bias resistors 10a, 10b and 10c; this oscillator is a known Hartley type and produces an alternating current voltage, although it is energized by direct current.

In the above circuitry, four transistors are used. The transistor is of the most common type used for low speed switching with its maximum rating, $Pc = 0.5$ watt, and $Ic = 0.5$ ampere.

Capacitors 9a, 9b and 9c are provided to bypass the high frequency components.

The sector-shaped rotational transducer 5 is provided inside the rotor case 3b, and it revolves together with the rotor 3 as it is secured to the rotor shaft 3a. As the transducer's parallel walls are directed toward the detecting coil, it is responsive to the magnetic flux issuing from the detecting coil 6a when in operation.

It is to be noted that it is necessary for the transducer when secured to thr rotor shaft to have the middle point of the sector arc of the transducer, the center of the transducer and the center between the N-pole and the S-pole of the cylindrical rotor aligned on a straight line.

When in operation, as soon as the forward portion of the transducer approaches the detecting coil, the transducer is affected by the detecting coil: there arises an eddy current in the transducer, which results in a decrease of impedance of the detecting coil, say, from 200 ohm to 150 ohm. The decrease of impedance of the detecting coil produces an unbalance current in the above circuitry, and this unbalance current is applied to the base of a transistor, whereby the current is amplified to excite the stationary winding 4a of the stator, and thus equal and opposite torques act on the stator and rotor in much the same manner as two permanent magnets react on each other: the same poles attract while the different poles repel each other.

As shown in FIG. 8 and FIG. 13, the sector-shaped transducer has two sizes: one has 240° at its center while the other has 120°. The former covers two detecting coils at one time while the latter covers one detecting coil only.

1. When the 120° transducer covers one detecting coil only.

The detecting coils, 6a – 6c, and a dummy coil 6d are excited by a high frequency current produced by the oscillator 8 of the circuitry, and the 120° transducer (which has 120° at the center) approaches one of the detecting coils, say, 6a, then it happens that an eddy current arises on the surface of the transducer – 120° to decrease the impedance thereof. In this manner, the approach and departure of the transducer will result in varying the impedance of the detecting coil, which is used for detecting the relative position between the poles of the magnet of the rotor and one of the three stationary windings of the stator. In this case, the impedance of the detecting coil is predetermined to be the minimum so that the maximum torque will be produced when the stationary winding is excited by its corresponding detecting coil. Thus, the 120° transducer shown in FIG. 13 is used.

Referring more particularly to the impedance of the three detecting coils 6a – 6c and of the dummy coil 6d, it is understood that it is affected by the approach and departure of transducer inoperation. The dummy coil 6d, however, is set to have a constant value of impedance, because it is provided so far away from the transducer that it will not be affected thereby.

We have described in the foregoing that the dummy coil 6d is set to have a constant value of impedance.

It is required that it should be set to be equal to an impedance of each of detecting coils 6a – 6c under the influence of the transducer.

Another method to set it lies in making the impedance of the dummy coil 6d to that of detecting coils 6a – 6c and adjusting the balance condition of the bridge circuit by the resistor 10g against the same value of resistance of resistors 10– 10f.

There are two middle points between the N-pole and S-pole on the circumference of the cylindrical ferrite magnet. When the transducer is set at one middle point in one direction, it will turn clockwise, but will turn counterclockwise when set at the other middle point in the other direction.

A switching circuit for controlling the excitation of the three stationary windings by the operation of three switches from the signal output derived from the change of impedances of the three detecting coils affected by the transducer will be described below:

In reference to the switching circuitry the comparison of impedances by utilizing a known bridge circuit is most convenient, for the input is the change of impedance. Further, it is good to control the transistor used for switching by the output of the bridge circuit.

The requirements for the switching circuit are listed below:
1. Sensitive to the change of impedance; on-off control of switching transistors is possible.
2. Power loss of switching transistors must be as small as possible.
3. When the simultaneous change of two impedances occurs, the transistor corresponding to the one with the greater change should be ON instead of two transistors being ON simultaneously.
4. At the same value of two impedances should occur at the same time, both transistors should be ON in order to eliminate any "deat point."

One of the circuits which meets the above requirements is a differential amplification one. It is seen that the differential amplification circuit meets the above requirements 1, 3, and 4, but does not meet requirement 2, because the power loss of resistor of common emitter (transistor) circuit is great.

We have invented a novel circuit which meets the above requirements and which combines a differential amplification circuit as an essential element with a bridge circuit and switching transistors. It is shown in FIG. 6, in which there are three stationary winding 4a, 4b, and 4c, high frequency oscillator 8, three detecting coils 6a, 6b and 6c, dummy coil 6d, resistors 10d – 10g, switching transistors 7a, 7b, and 7c, 120° transducer 5, rotor 3, and stator 2.

Assume that the resistors 10d – 10g have the same value, which is almost the same as that of an input impedance when the switching transistors are "on." Assume that the value of detecting coils 6a – 6d is the same, about 0.1 m Henry, respectively.

The value of the impedance of four detecting coils at the oscillating frequency of the high frequency oscillator is set to the the same as that of resistors 10d – 10g, about 15 ohms, respectively.

The above requirements are to make the sensibility and efficiency of a bridge circuit a maximum, and the bridge circuit is described hereinbelow. Six bridge circuits are established by making four arms or elements of the bridge from four detecting coils 6a – 6d, and four resistors 10d – 10g, respectively.

|  | Four Arms (Load) | | | |
| --- | --- | --- | --- | --- |
|  | Coil | Resistor | Coil | Resistor |
| Bridge Circuit 1 | 6d | 10g | 6a | 10d |
| Bridge Circuit 2 | 6d | 10g | 6b | 10e |
| Bridge Circuit 3 | 6d | 10g | 6c | 10f |
| Bridge Circuit 4 | 6a | 10d | 6b | 10e |
| Bridge Circuit 5 | 6a | 10d | 6c | 10f |
| Bridge Circuit 6 | 6b | 10e | 6c | 10f |

In this invention the six bridge circuits listed above are fully utilized to advantage, and let us make a fuller study of them in connection with the balance requirement thereof.

The requirement to make each bridge circuit balance is expressed as follows:

$$\frac{Za}{Rd} = \frac{Zb}{Re} = \frac{Zc}{Rf} = \frac{Zd}{Rg} \tag{1}$$

where $Za$, $Zb$, $Zc$ and $Zd$ are the values of impedance of the coils 6a, 6b, 6c and 6d, respectively; and $Rd$, $Re$, $Rf$ and $Rg$ are the values of resistance of the resistors 10d, 10e, 10f and 10g, respectively.

In order to make the sensibility and efficiency of each bridge circuit uniform, it is desirable that:

$$Za = Zb = Zc \tag{2}$$
$$Rd = Re = Rf \tag{3}$$

Therefore the impedance of the dummy coil $Zd$ can be determined by the following equation:

$$Zd = \frac{Rg}{Rd} \times Za \tag{4}$$

As a matter of fact, the above expression (4) may be nearly equal. However, when the above expression (4) is nearly equal, it is permissible if any bridge circuit is at unbalance when any of the switching transistors 7a, 7b and 7c does not work.

A special case may be denoted:

$$Rg \approx Rd \tag{5}$$
$$Zd \approx Za \tag{5}$$

In view of the change of impedance of each coil, the balance requirement of the six bridge circuits can be denoted from the expression (1):

$$\frac{Za\ max}{Rd} = \frac{Zb\ max}{Re} = \frac{Zc\ max}{Rf} = \frac{Zd}{Rg} \tag{6}$$

-continued $$\frac{Za \text{ min}}{Rd} = \frac{Zb \text{ min}}{Re} = \frac{Zc \text{ min}}{Rf} = \frac{Zd}{Rg} \quad (7)$$

where $Za$ max, $Zb$ max and $Zc$ max are the maximum values of $Za$, $Zb$ and $Zc$, respectively, while $Za$ min, $Zb$ min and $Zc$ min are the minimum values of $Za$, $Zb$ and $Zc$, respectively.

The expression (6) shows the conditions when the 120° transducer is used while the expression (7) indicates the condition when the transducer is used, which will be described hereinafter.

For reference, the actual value of Z and R, in the brushless direct current motor of this invention, may be in the range of one to one thousand ohms. The maximum value of Z of the coil is shown by the upper graph and the minimum value thereof by the lower graph of the change of impedance of the coil illustrated at the top in FIG. 12, wherein the ratio of minimum value to maximum is more than 0.6 at most.

Referring to FIG. 12 in more detail, it shows the schematic diagram of the excitation system of the invention, wherein at the top 0° – 360° refers to the rotary position of the rotor or transducer the motor. Immediately below, the changes of impedance of the detecting coils $6a - 6c$ are shown, wherein the dot-and-dash line refers to that of the coil $6a$, the dash line to that of the coil $6b$, the dotted line to that of the coil $6c$, and the solid straight line to that of the dummy coil $6d$ which undergoes no change of impedance. Immediately below the coils, the changes of unbalance voltage of the bridge circuits 1 – 6 are shown at six stages, respectively, wherein the hatched portions illustrate the flow of unbalance current. At the last three stages, the exciting currents of the three stationary windings $4a - 4c$ are shown.

Each of the bridge circuits 1 – 3 containing the dummy coil $6d$, respectively, has a load from the base to the emitter of each of switching transistors $7a$, $7b$, and $7c$.

As described before, four detecting coils including the dummy coil $6d$ are of the same constructions, but the dummy coil $6d$ is installed on a printed circuit board $6f$ spaced from the rotor case $3b$ containing the three detecting coils $6a - 6c$ so that the dummy coil $6d$ will not be affected by the transducer. The presence of the dummy coil $6d$, however, in the circuitry is one of the distinctive features of the present invention.

The impedance of the detecting coils except the dummy coil is variable, but that of the dummy coil $6d$ is set to have a constant value of impedance, say 0.1 mH.

As shown in FIG. 6, the bridge circuits 1 – 3 with the dummy coil $6d$ have a load from base to emitter of each of the switching transistors $7a$, $7b$ and $7c$; and the bridge circuits 4 – 6 without the dummy coil $6d$ have a load from base to base of each of the switching transistors $7a$, $7b$ and $7c$.

We will explain how the bridge circuit works if it contains the dummy coil $6d$ or not. To this end, the bridge circuit 1 containing the dummy coil $6d$ and the bridge circuit 4 containing no dummy coil $6d$ are explained. Each element or arm of the bridge circuit should be constructed to have such a value of impedance that it satisfies the expression (6) set forth hereinbefore, and its special case is described below.

Let us assume that the resistors $10d - 10g$ have the same value of resistance, and the detecting coils $6a - 6d$ have the same value of impedance when they are not affected by the transducer. In this case the bridge circuits 1 – 6 are all in balance. As described hereinbefore, the transducer approaches each of the coils $6a - 6c$, but it does not approach the dummy coil $6d$ which has the constant value of impedance.

The bridge circuit 1 works as follows: when the transducer is away from the coil $6a$, the bridge circuit 1 is in balance; and when the transducer approaches the coil $6a$ to decrease its impedance due to the eddy current which occurs on the surface of the transducer, the bridge circuit 1 is unbalanced, the voltage produced thereby being applied from base to emitter; of switching transistor $7a$ to switch it ON. Thus the transistor $7a$ responds a little at the end of the line to the change of impedance and consumes electric power. Accordingly, the requirements 1 and 2 are satisfied. Likewise in the bridge circuits 2 and 3, with a change of impedance of the coils $6b$ and $6c$, the switching transistor $7b$ or $7c$ is switched ON. Thus, it is seen that in the bridge circuits 1, 2 and 3, owing to the change of impedance of the coils $6a - 6c$ when approached by the transducer one by one, the switching transistors $7a$, $7b$ and $7c$ become conductive and, at the same time, amplify the current to excite the corresponding stationary windings of stator.

Now, let us consider the bridge circuit with no dummy coil. How the bridge circuit 4 works is shown in FIG. 7, in which unbalance currents $i_1$, $i_2$ and $i_3$ correspond to those of bridge circuits 1, 2 and 4. The circuitry shown in FIG. 7 resembles that for differential amplification wherein a positive electric source is transferred from Q line to P line, so that this circuitry works as a differential amplification one. Although, however, there is a positive electric source at Q line, the amplication circuitry works invariably.

Referring to the bridge circuit 4 again, which is also in balance when the bridge circuits 1 and 2 are at balance, when there is a change of impedance of the coil $6a$, the bridge circuit 1 is at unbalanced while the bridge circuit 2 is in balance, and then the bridge circuit 4 becomes unbalanced. This unbalance current $i_3$ is applied from the base to the emitter of the switching transistor $7b$, and from the emitter to the base of the switching transistor $7a$, but the switching transistor $7b$ is non-conductive due to the balanced condition of the bridge circuit 2. Hence the unbalance current of the bridge circuit 4 does not flow.

Due to the balance of the bridge circuit 2, there is no unbalance voltage from the base to the emitter of the switching transistor $7b$, hence no current flows therebetween. In this condition, only the bridge circuit 1 works, and the bridge circuit 4 is at unbalanced, but the unbalance current does not flow, so the bridge circuit 4 does not work. Both bridge circuits 1 and 2 are unbalanced owing to the change of impedance of the detecting coils $6a$ and $6b$, and further, in view of the amount of unbalance being greater than the change of impedance of the coil $6a$, which results in the unbalance of bridge circuit 4.

In this condition the switching transistor $7a$ has a base current $i_4$: $i_4 = i_1 \mp i_3$ and the switching transistor $7b$ has a base current $i_5$: $i_5 = i_2 - i_3$. On the other hand, the current $i_1$ is bigger than the current $i_2$ in proportion to the unbalance currents of bridge circuits 1 and 2. Hence the current $i_4$ is bigger than the current $i_5$, so the switching transistor 7a is conductive while the switching transistor 7b is non-conductive (see FIG. 7).

In this manner, though the impedance of two coils 6a and 6b changes simultaneously, the switching transistor and the stationary winding of the stator are conductive in accordance with the detecting coil wherein a greater change of impedance occurs. Thus, the requirement 3 described above is met thereby.

Next, let us consider that the impedances of coils 6a and 6b change simultaneously, and the same value of impedance results. Then, the bridge circuits 1 and 2 are unbalanced due to the change of impedances of coils 6a and 6b and the unbalance currents $i_1$ and $i_2$ flow. In the bridge circuit 4, however, the coils 6a and 6b produce the same value of impedance to bring about the balance condition so that the unbalance current $i_3$ does not flow. Hence the unbalance currents $i_1$ and $i_2$ make the switching transistors 7a and 7b a conductive simultaneously so that the stationary windings 4a and 4b of the stator 2 are excited. Thus the requirement 4 is satisfied.

However, as described in the foregoing, it is not desirable for the d.c. motor to excite two stationary windings of the stator continuously or in a wide angle. Therefore the change of impedance of three detecting coils produces three phase sinusoidal wave, but the change rate of impedance becomes large in the neighborhood of the point where the waves intersect one another (that is: impedances are equal). Thus, it is required that the region where two stationary windings (two-phase) are excited should be as small as possible. To this end, particular attention should be paid to the shape of the detecting coil and the sector shape of the transducer. The change of impedance of the coil should preferably be similar to a square wave.

To summarize the operation of the above-mentioned switching circuit, in the bridge circuits 1, 2 and 3, with a dummy coil, one or two of the switching transistors 7a, 7b and 7c is (or are) the conductive due to the change of impedance of coils 6a, 6b and 6c. If no dummy coil is used, no switching is done. Furthermore, in the bridge circuits 4, 5 and 6, when the simultaneous change of impedance of two of the three coils should happen, the coil the change range of which is the greatest should be amplified and the switching transistor connected thereto should be conductive.

It is understood that the switching circuit described in the foregoing is combined with an amplification one. In reference to the transistor, a PNP type is used in this invention, but an NPN type may be used. Moreover, it is understood that the polarity of electric source may be changed, and positive as well as negative may be also changed.

In this invention, the four arms of the bridge circuit comprises two resistors and two coils. Provided that the direct current bias is properly applied to the base of the transistor, 7a, 7b or 7c, it can be seen that each arm may be selected from among a resistor, inductance (coil), and capacitor, individually or in combination.

Referring more particularly to the bridge circuits 1 – 6 again, the bridge circuits 1 – 3 work independently, in other words, an exciting current to excite one of the stator windings is produced across each of the circuits 1 – 3 and amplified through each of the transistors 7a – 7c independently, respectively; and the remaining bridge circuits 4 – 6 work as follows: the bridge circuit 4 functions to select the stronger impedance of the two circuits 1 and 2; the circuit 5 functions to select the stronger impedance of the circuits 1 and 3; and the circuit 6 functions to select the stronger impedance of the circuits 2 and 3.

2. When the 240° transducer covers two detecting coils.

As described hereinbefore, the sector-shaped transducer 5 has two forms: one has 120° at its center as shown in FIG. 13 and is described in the foregoing, and the other has 240°at its center as shown in FIG. 8 which will be described hereinbelow. Each arm or element of the bridge circuit should be constructed to have a value of impedance according to the expression (7) described hereinabove, and its special case is described below.

The 240° transducer is so made as to cover two detecting coils and not the remaining detecting coil. The dummy coil 6d has the same shape as that of the coils 6a – 6c, but its impedance is set to have a constant value, because it is spaced away from the influence of the transducer. The impedance of the three coils 6a – 6c is variable, because it is affected by the transducer. The resistors 10d – 10g have the same value of resistance.

Under the above condition, every bridge circuit described above is in balance. In operation, when the 240° transducer approaches any of the coils 6a – 6c, a bridge circuit containing the coil under the transducer is in balance while a bridge circuit containing a coil which is not under the transducer is unbalanced.

In FIG. 12, the stationary winding 4a of the stator and the detecting coil 6a shall be a starting point, respectively, in operation, and the rotor together with the 240° transducer shall revolve in clockwise direction. The angle of the starting point shall be 0° in FIG. 12. With the rotation of the 240° transducer, the impedance of every coil is shown in FIG. 12 which indicates that the impedance is great when the coil is not covered by the 240° transducer while it is small when the coil is covered by the transducer. Besides, the slope in accordnce with the increase or decrease of impedance depends on the position of the coil viewed from the revolving shaft.

The change rate of impedance of the coil resulting from the approach or departure of the transducer to or from the coil depends on how much magnetic flux exists which permeates through the transducer relative to the total magnetic flux produced by the coil.

At the 0°position of the 240° transducer in FIG. 12, the impedance of the coil 6a is the greatest while that of the other coils is small. For convenience of explanation, the impedances of the coils are shown as not intersecting one another, but they coincide with one another in the region where they are small. In this case the bridge circuits 1, 4 and 5 containing the coil 6a are at unbalanced, respectively, and in every bridge circuit an unbalanced voltage occurs as shown at the middle portion in FIG. 12. As the bridge circuits are energized by the high frequency voltage energy produced by the high frequency oscillator, this unbalance voltage becomes a high frequency one, say, about 50 kHz, having both positive and negative voltages, and an envelope of high frequency voltage is as shown in FIG. 12. Therefore the unbalance current of the bridge circuit 1 flows for an interval of a half cycle only as long as the unbalance voltage is positive, but it does not flow for an interval of a subsequent half cycle of the negative voltage. Accordingly, FIG. 12 shows a hatched positive portion of bridge circuit 1 (likewise, bridge circuits 2 and 3, too) where the unbalance current flows. Bridge circuits 4 and 5 are unbalanced, but unbalance current does not flow because bridge circuits 2 and 3 are balanced. The unbalance current of bridge circuit 1 is applied to the switching transistor for amplification in order to excite the stationary winding 4a of the stator.

The ratio of exciting current to the unbalance current should be about 10:1, which is suitable for the switching transistor to work better and reduce the loss of power. Hence the exciting current is nearly equal to the value of current determined by the ratio of electric source voltage to the resistance of the stationary winding. This condition remains until the rotational position 45° is reached owing to the constant value of impedance of coil 6a.

From the rotational positions 45° to 60°, the impedances of coils 6a and 6b change; the impedance of coil 6a is greater than that of coil 6b. Therefore the bridge circuits 1, 2, 4, 5 and 6 including the coils 6a and 6b are at unbalanced, respectively, to produce an unbalance voltage as shown in FIG. 12, and the unbalance current of bridge circuits 1 and 2 flows.

Owing to the unbalance current of bridge circuits 1 and 2, switching transistors 7a and 7b are conductive so that an unbalance current flows through the bridge circuit 4. The bridge circuit 3 is in balance, hence the switching transistor 7c is non-conductive.

In the bridge circuits 5 and 6 where the unbalance current should flow through the switching transistor 7c, the unbalance current does not flow. Therefore in the interval from 45° to 60°, only the unbalance current of bridge circuits 1, 2 and 4 flows.

As described above, the impedance of coil 6a is larger than that of coil 6b, so the unbalance current of bridge circuit 4 increases the unbalance current of bridge circuit 1 and decreases the unbalance current of bridge circuit 2, and thus produces an exciting current to the stationary windings 4a and 4b.

At the rotational position 60°, the coils 6a and 6b change simultaneously to obtain the same value. In this case, different from the condition in the previous positions 45° to 60°, the bridge circuit 4 is in balance so that an unbalance current does not flow. As a result, the unbalance currents of bridge circuits 1 and 2 have the same value so that the exciting currents of stationary windings 4a and 4b have the same value.

From another viewpoint of the positions from 45° to 75°, 45° to 60°, the impedances of coils 6a and 6b are opposite as to size. Hence the unbalance current of bridge circuit 4 decreases that of bridge circuit 1 and increases that of bridge circuit 2 in order to produce the exciting current for the stationary windings 4a and 4b.

From another viewpoint of the positions from 45° to 75° it is seen that the slope of the envelope of the unbalance voltage of bridge circuits 1 and 2 corresponds to that of the change of impedances of coils 6a and 6b. However, in reference to the slope of the unbalance voltage of bridge circuit 4, the slope of impedance of coil 6a or 6b is just the opposite, that is, the more the coil 6a the less the coil 6b. Hence the slope of bridge circuit 4 is about twice that of bridge circuit 1. Therefore the addition or subtraction of the unbalance voltage or current of bridge circuits 1, 2 and 4, respectively, makes the input and output or exciting current of switching transistor vary about three times as much.

When the input of the switching transistor has a higher value than a certain level, the exciting current is substantially determined by the ratio of the electric source voltage to the resistance of the stationary winding, and the input is satisfied when the impedance of the coil is the greatest. Furthermore, when the input is lower than a certain level, the exciting current becomes zero due to the voltage drop (which is not equal to 0.5 volt). Therefore the region of increase or decrease of the slope becomes about one-third as much as that of the impedance of the coil.

Thus, the transition region of exciting current is shorter than the varying region of the impedance of the coil, and in actual motors it can be set to be much shorter.

If the switching region is too long, it is not only undesirable for the brushless d.c. motor as described above, but also leads to a decrease of efficiency, to an increase of heat, and thus to a short life in general, because the power loss of the switching transistor is the largest.

In the unbalance voltage in the region 45° to 75° of bridge circuit 4, the hatched portion shows a positive voltage between 45° and 60°, and a negative voltage between 60° and 75°. This is because the polarity of the voltage is taken so that an unbalance voltage can be added as such to an unbalance voltage of bridge circuit 1. Accordingly, subtraction must be done for the bridge circuit 2.

Similarly, the hatched portion of the unbalance voltage of the bridge circuit 5 in the neighborhood of the rotational position 300° may be added as such to that of the bridge circuit 3, and subtracted from that of the bridge circuit 1.

Moreover, the hatched portion of the unbalance voltage of the bridge circuit 6 in the neighborhood of the rotational position 180° may be added as such to that of the bridge circuit 2, and subtracted from that of the bridge circuit 3.

In the region of the rotational positions 75° to 165°, the stationary winding 4b is excited by the operation of the bridge circuit 2 in a similar manner as described above, because the impedance of the coil 6b only is increased.

And then, in the region of 165° to 360°, the coil to be energized to increase its impedance, the bridge circuit to be operated thereby, the switching transistor to be energized thereby, and the stationary winding to be excited thereby, proceed in succession as same as before.

By the operation described above, the exciting current flows through the stationary winding corresponding to the coil to be energized to increase its impedance, thus a revolving torque is produced. With the rotation of the rotor magnet together with the transducer, the neighboring coil increases its impedance in order to excite the stationary winding corresponding thereto to produce torque, thus the brushless d.c. motor of this invention rotates continuously. As fully described in the foregoing, an ideal exciting current will be able to be applied to each stationary winding by the cooperation of the switching effect of bridge circuits 1, 2 and 3 together with the differential effect of bridge circuits 4, 5 and 6.

Referring more particularly to the shield case 12 in ring form shown in FIG. 10 in perspective, the shield case in the form of a ring is made of a high permeability metal, such as, iron or steel, and is provided around the three detecting coils in order to prevent the magnetic induction issuing from the rotor and the stationary windings of the stator from affecting the coils. The shield case 12 is secured to the rotor 3. Without the shield case 12, it is necessary for the detecting coils to be spaced away from the origin of the magnetic induction, the rotor and the stationary windings, and therefore there is a disadvantage that the d.c. motor must be made rather long. However, with the provision of the shield case 12, there is an advantage that the d.c. motor of this invention can be made in a compact form with as free a design as possible.

While the invention has been described in its preferred embodiments, it is to be understood that the changes within the purview of the appended claims may be made without departing from the scope and spirit of the invention.

We claim:

1. A brushless direct current fractional horsepower motor, comprising in combination:
   a housing and a cover therefor;
   a stator within the housing having three stationary windings arranged around the periphery of the motor;
   a permanently magnetized rotor rotatable therebetween; detector means around said rotor for detecting the position of said rotor relative to said stator windings, said detector means comprising three detecting coils fixed on said stator and a rotational sector-shaped transducer rotatable with said rotor past said coils;
   a resistor in series with each detecting coil;
   a dummy coil spaced from said rotor and a further resistor in series therewith;
   a source of high frequency alternating current connected in parallel to the respective series connected coils and resistors;
   three switching transistors having the collectors coupled to the stationary windings, having the bases connected to the junctions between the detecting coils and associated resistors and having the emitters connected in common to the junction between the dummy coil and further resistor; and
   a source of power across which the emitters of the switching transistors and the three stationary windings are coupled in parallel.

2. A brushless direct current motor as claimed in claim 1 further comprising a shield case in said housing for said detecting coils, said shield case being in the form of a ring and secured to said rotor and said shield case being made of a high permeability metal selected from the group consisting of iron and steel.

3. A brushless direct current motor as claimed in claim 1 in which said sector-shaped transducer has a sector having a center angle of 240°.

4. A brushless direct current motor as claimed in claim 1 in which said sector-shaped transducer has a sector having a center angle of 120°.

5. A brushless direct current motor as claimed in claim 1 in which said sector-shaped transducer is made of non-ferrous metal selected from the group consisting of aluminum and copper.

6. A brushless direct current motor claimed in claim 1 in which the value of the impedance of said dummy coil is according to the equation $Zd=(Rg/Rd) \times Za$, wherein $Za/Rd=Zb/Re=Zc/Rf=Zd/Rg$, $Za = Zc$, and $Rd = Re = Rf$, where $Za$, $Zb$, $Zc$ and $Zd$ are the values of the impedance of said detecting coils, and $Rd$, $Re$, $Rf$ and $Rg$ are the values of resistance of said resistors.

7. A brushless direct current motor as claimed in claim 1 in which the impedance of said dummy coil is equal to that of each of said detecting coils when said detecting coils are under the influence of said transducer during operation of the motor, and said dummy coil is positioned sufficiently far away from said transducer that said dummy coil will not be affected by said transducer.

8. A brushless direct current motor as claimed in claim 1 in which the impedance of said dummy coil is equal to that of each of said detecting coils when said detecting coils are not affected by said transducer during operation of the motor, and said dummy coil is positioned sufficiently far away from said transducer that said dummy coil will not be affected by said transducer.

9. A brushless direct current motor as claimed in claim 1 in which the impedance of said dummy coil is at a value which will balance the respective bridge circuits containing the dummy coil and the respective detecting coils for the impedance of each of said detecting coils when said detecting coils are under the influence of said transducer during the operation of the motor, and said dummy coil is positioned sufficiently far away from said transducer that said dummy coil will not be affected by said transducer.

10. A brushless direct current motor as claimed in claim 1 in which the impedance of said dummy coil is at a value which will balance the respective bridge circuits containing the dummy coil and the respective detecting coils for the impedance of each of said detecting coils when the detecting coils are not affected by said transducer during operation of the motor, and said dummy coil is positioned sufficiently far away from said transducer that said dummy coil will not be affected by said transducer.

* * * * *